US012392252B2

(12) United States Patent
Lutjen et al.

(10) Patent No.: US 12,392,252 B2
(45) Date of Patent: Aug. 19, 2025

(54) HYBRID BONDED CONFIGURATION FOR BLADE OUTER AIR SEAL (BOAS)

(71) Applicant: RTX Corporation, Farmington, CT (US)

(72) Inventors: Paul M. Lutjen, Kennebunkport, ME (US); John R. Farris, Lebanon, CT (US); Brian T. Hazel, Avon, CT (US); Matthew A. Devore, Rocky Hill, CT (US); John A. Sharon, West Hartford, CT (US); James F. Wiedenhoefer, Windsor, CT (US); Mario P. Bochiechio, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 88 days.

(21) Appl. No.: 17/842,924

(22) Filed: Jun. 17, 2022

(65) Prior Publication Data

US 2023/0151738 A1 May 18, 2023

Related U.S. Application Data

(60) Provisional application No. 63/212,325, filed on Jun. 18, 2021, provisional application No. 63/232,972, filed on Aug. 13, 2021.

(51) Int. Cl.
*B23P 17/00* (2006.01)
*F01D 11/08* (2006.01)
*F01D 25/00* (2006.01)

(52) U.S. Cl.
CPC ............ *F01D 11/08* (2013.01); *F01D 25/007* (2013.01); *F05D 2230/10* (2013.01);
(Continued)

(58) Field of Classification Search
CPC ...... F01D 11/08; F01D 25/007; F01D 11/122; F01D 5/182; F01D 5/185; F01D 5/087;
(Continued)

(56) References Cited

U.S. PATENT DOCUMENTS 3,394,918 A 7/1968 Wiseman
5,264,011 A 11/1993 Brown et al.
(Continued)

FOREIGN PATENT DOCUMENTS

DE 102014206827 A1 10/2015
EP 0309627 B1 6/1993
(Continued)

OTHER PUBLICATIONS

Lin et al. "Sintering and joining of Ni-based superalloys via FAST for turbine disc applications" Metallurgical and Materials Transactions A, vol. 51 No. 3, pp. 1353-1366 (Mar. 2020).
(Continued)

*Primary Examiner* — Jun S Yoo
(74) *Attorney, Agent, or Firm* — CANTOR COLBURN LLP

(57) ABSTRACT

A method of assembling a part is provided and includes forming a first section of the part, defining, in the first section, passages with dimensions as small as 0.005 inches (0.127 mm), forming a second section of the part, metallurgically bonding the first and second sections whereby the passages are delimited by the first and second sections and executing the metallurgically bonding without modifying a condition of the passages.

11 Claims, 5 Drawing Sheets

(52) U.S. Cl.
CPC ...... *F05D 2230/21* (2013.01); *F05D 2230/22* (2013.01); *F05D 2260/204* (2013.01)

(58) Field of Classification Search
CPC ........ F01D 25/12; F01D 11/24; F01D 11/005; F05D 2230/10; F05D 2230/21; F05D 2230/22; F05D 2260/204; F05D 2230/90; F05D 2240/11; F05D 2230/14; B23P 17/00; B23P 15/02; B23P 15/00; B23P 15/04
See application file for complete search history.

(56) References Cited

U.S. PATENT DOCUMENTS

| | | | |
|---|---|---|---|
| 5,395,699 | A | 3/1995 | Ernst et al. |
| 5,636,439 | A | 6/1997 | Cunha et al. |
| 6,131,800 | A | 10/2000 | Fernihough et al. |
| 6,217,282 | B1 | 4/2001 | Stanka |
| 6,384,365 | B1 | 5/2002 | Seth et al. |
| 7,371,049 | B2 | 5/2008 | Cunha et al. |
| 7,441,331 | B2 | 10/2008 | Hudson et al. |
| 8,231,354 | B2 | 7/2012 | Campbell et al. |
| 8,267,663 | B2 | 9/2012 | Larose et al. |
| 8,474,137 | B2 | 7/2013 | Richter et al. |
| 9,221,101 | B2 | 12/2015 | Hugot et al. |
| 9,656,321 | B2 | 5/2017 | Cui et al. |
| 9,687,910 | B2 | 6/2017 | Bullied et al. |
| 9,700,941 | B2 | 7/2017 | James et al. |
| 9,782,862 | B2 | 10/2017 | Kamel et al. |
| 9,802,248 | B2 | 10/2017 | Marcin, Jr. et al. |
| 9,976,435 | B2 | 5/2018 | Borja et al. |
| 10,005,125 | B2 | 6/2018 | Shah et al. |
| 10,035,185 | B2 | 7/2018 | Shah et al. |
| 10,065,239 | B2 | 9/2018 | Marcin, Jr. et al. |
| 10,145,245 | B2 | 12/2018 | Roberge et al. |
| 10,239,142 | B2 | 3/2019 | Bareiss et al. |
| 10,247,028 | B2 | 4/2019 | Blaney et al. |
| 10,287,896 | B2 | 5/2019 | Marcin, Jr. et al. |
| 10,316,683 | B2 | 6/2019 | Palmer |
| 10,449,605 | B2 | 10/2019 | Bullied et al. |
| 10,458,249 | B2 | 10/2019 | McCaffrey et al. |
| 10,584,602 | B2 | 3/2020 | Bareiss et al. |
| 10,843,271 | B2 | 11/2020 | Motin et al. |
| 11,203,064 | B2 | 12/2021 | Ozbaysal et al. |
| 2004/0134897 | A1 | 7/2004 | Das et al. |
| 2005/0091848 | A1 | 5/2005 | Nenov et al. |
| 2007/0141368 | A1 | 6/2007 | Farmer et al. |
| 2008/0166225 | A1* | 7/2008 | Strangman ............ F01D 11/122 415/173.4 |
| 2012/0263576 | A1* | 10/2012 | Lacy ...................... F01D 25/12 415/115 |
| 2013/0205801 | A1 | 8/2013 | Xu et al. |
| 2014/0237784 | A1 | 8/2014 | Lacy et al. |
| 2014/0263579 | A1 | 9/2014 | Kulkarni et al. |
| 2014/0294652 | A1 | 10/2014 | Morrison et al. |
| 2015/0147165 | A1* | 5/2015 | Bunker ..................... C23C 4/01 427/455 |
| 2015/0345296 | A1 | 12/2015 | Davidson et al. |
| 2016/0158840 | A1* | 6/2016 | Cologna ................. B22F 3/105 419/7 |
| 2016/0186612 | A1 | 6/2016 | Anga et al. |
| 2016/0215627 | A1 | 7/2016 | Roberge et al. |
| 2017/0333995 | A1* | 11/2017 | Ott .......................... B22F 10/64 |
| 2018/0223681 | A1* | 8/2018 | Gallier .................... F01D 11/24 |
| 2019/0039133 | A1 | 2/2019 | Cui et al. |
| 2019/0054537 | A1 | 2/2019 | Mottin et al. |
| 2019/0076930 | A1 | 3/2019 | Mottin et al. |
| 2020/0215640 | A1 | 7/2020 | Sheedy et al. |
| 2020/0255345 | A1* | 8/2020 | Clark ...................... C04B 35/80 |
| 2021/0254474 | A1 | 8/2021 | Farris et al. |
| 2021/0332706 | A1 | 10/2021 | Bales et al. |
| 2022/0403742 | A1 | 12/2022 | Hazel et al. |
| 2022/0403755 | A1 | 12/2022 | Hazel et al. |
| 2023/0147399 | A1 | 5/2023 | Farris et al. |
| 2023/0151736 | A1 | 5/2023 | Hazel et al. |

FOREIGN PATENT DOCUMENTS

| | | | |
|---|---|---|---|
| EP | 0744529 | A1 | 11/1996 |
| EP | 1097779 | A1 | 5/2001 |
| EP | 1332824 | A2 | 8/2003 |
| EP | 1643081 | A2 | 4/2006 |
| EP | 1760265 | B1 | 7/2007 |
| EP | 2078579 | A1 | 7/2009 |
| EP | 2511482 | A2 | 10/2012 |
| EP | 2657451 | A2 | 10/2013 |
| EP | 2982471 | A1 | 2/2016 |
| EP | 3034810 | A1 | 6/2016 |
| EP | 3090139 | A2 | 11/2016 |
| EP | 3095971 | A1 | 11/2016 |
| EP | 3575016 | A1 | 12/2019 |
| EP | 3575424 | A1 | 12/2019 |
| EP | 3712122 | A1 | 9/2020 |
| EP | 3848555 | A1 | 7/2021 |
| EP | 3865664 | A1 | 8/2021 |
| FR | 2981590 | A1 | 4/2013 |
| WO | 2015023321 | A2 | 2/2015 |
| WO | 2015122953 | A2 | 8/2015 |
| WO | 2021023945 | A1 | 2/2021 |

OTHER PUBLICATIONS

Lin et al.;"Solid-State Joining of Dissimilar Ni-Based Superalloys via Field-Assisted Sintering Technology for Turbine Applications"; Metallurgical and Materials Transactions A 52.6; Jun. 2021, pp. 2149-2154.

Search Report issued in European Patent Application No. 22179741.8; Application Filing Date Jun. 17, 2022; Date of Mailing Oct. 31, 2022 (8 pages).

Search Report issued in European Patent Application No. 22179744.2; Application Filing Date Jun. 17, 2022; Date of Mailing Oct. 31, 2022 (8 pages).

Search Report issued in European Patent Application No. 22179758.2; Application Filing Date Jun. 17, 2022; Date of Mailing Nov. 3, 2022 (7 pages).

Search Report issued in European Patent Application No. 22179759.0; Application Filing Date Jun. 17, 2022; Date of Mailing Nov. 4, 2022 (9 pages).

Search Report issued in European Patent Application No. 22179733.5; Application Filing Date Jun. 17, 2022; Date of Mailing Nov. 9, 2022 (11 pages).

Search Report issued in European Patent Application No. 22179745.9; Application Filing Date Jun. 17, 2022; Date of Mailing Nov. 9, 2022 (12 pages).

Walston; "Coating and Surface Technologies for Turbine Airfoils"; Superalloys 2004; TMS (The Minerals, Metals & Materials Society); Jan. 2004, pp. 579-588.

Harris et al.; "MAR M 247 Derivations—CM 247 LC DS Alloy CMSX Single Crystal Alloys Properties & Performance" The Wayback Machine; Superalloys; Jan. 1984, pp. 221-230.

Brochure: "International Workshop on Field Assisted Sintering Technology" Jun. 2017, The Pennsylvania State University, University Park, Pennsylvania (2 pages).

Charis Lin, et al.:"Single Crystal Ni Superalloy Joining: Preliminary Results", Updated Nov. 9, 2020; pp. 1-20.

Office Action for EP Application No. 22179745.9; Mail date Oct. 8, 2024 (4 pages).

Office Action for EP Application No. 22179733.5; Mail date Oct. 14, 2024 (6 pages).

* cited by examiner

HYBRID BONDED CONFIGURATION FOR BLADE OUTER AIR SEAL (BOAS)

CROSS-REFERENCE TO RELATED APPLICATIONS

This application claims priority to U.S. Provisional Application No. 63/212,325 filed Jun. 18, 2021, and U.S. Provisional Application No. 63/232,972 filed Aug. 13, 2021, the contents of which are hereby incorporated by reference in their entirety.

BACKGROUND

The present disclosure relates to blade outer are seal (BOAS) and, more particularly, to a hybrid bonded configuration for BOAS.

BOAS are actively cooled by BOAS cooling flow to meet thermal requirements in certain operating environments. This BOAS cooling flow is often parasitic to engine performance and is thus controlled to minimize allocation. Therefore, active cooling can subject the BOAS to thermal gradients due to the one-sided heat loads. Thermal gradients affect BOAS distortion and result in variance in tip clearance to the turbine blade and reduced part life.

Accordingly, an improved method of designing and configuring a BOAS is needed.

Also, BOAS are often exposed to high temperature products of combustion on a "hot" surface and cooler compressor cooling air on a "cold" surface. Exposure to air at different temperatures can lead to different phenomena. In the case of the hot side, products of combustion can cause oxidation to the surface of the BOAS. On the cold side, temperatures exist in a range where corrosion can occur. When designing a BOAS, an alloy is chosen to best balance the hot and cold side modes, but many not be optimal for either. Coatings may also be applied to resist each mode but such coating present issues relating to processing and durability.

In addition, BOAS often require highly effective cooling in advanced engines with higher temperatures. Current manufacturing limits on ceramic cores restrict the channel height of cooling circuits, however.

Accordingly, an improved method of designing and configuring a BOAS is needed so that cooling capabilities can be improved.

BRIEF DESCRIPTION

According to an aspect of the disclosure, a method of assembling a part is provided and includes forming a first section of the part, defining, in the first section, passages with dimensions as small as 0.005 inches (0.127 mm), forming a second section of the part, metallurgically bonding the first and second sections whereby the passages are delimited by the first and second sections and executing the metallurgically bonding without modifying a condition of the passages.

In accordance with additional or alternative embodiments, the part includes a blade outer air seal (BOAS) of a gas turbine engine and the passages are fluidly coupled to a cooling circuit.

In accordance with additional or alternative embodiments, the first and second sections include similar or dissimilar materials.

In accordance with additional or alternative embodiments, the method further includes coating the passages.

In accordance with additional or alternative embodiments, the forming of the first section includes at least one of casting and machining and the forming of the second section includes at least one of casting and machining.

In accordance with additional or alternative embodiments, the defining includes recessing the passages into the first section from an edge of the first section and the metallurgically bonding includes bonding the edge of the first section to a corresponding edge of the second section.

In accordance with additional or alternative embodiments, the metallurgically bonding includes at least one of field assisted sintering technology (FAST) and/or spark plasma sintering (SPS).

According to an aspect of the disclosure, a method of assembling a blade outer air seal (BOAS) of a gas turbine engine with a cooling circuit is provided and includes forming a first section of the BOAS, defining, in the first section, passages fluidly coupled to the cooling circuit with dimensions as small as 0.005 inches (0.127 mm), forming a second section of the BOAS, metallurgically bonding the first and second sections whereby the passages are delimited by the first and second sections and executing the metallurgically bonding without modifying a condition of the passages.

In accordance with additional or alternative embodiments, the first and second sections include similar or dissimilar materials.

In accordance with additional or alternative embodiments, the method further includes coating the passages.

In accordance with additional or alternative embodiments, the first section includes a corrosion resistant alloy and the second section includes an oxidation resistant alloy.

In accordance with additional or alternative embodiments, the second section further includes at least one of a thermal barrier coating or an abradable coating.

In accordance with additional or alternative embodiments, the forming of the first section includes at least one of casting and machining and the forming of the second section includes at least one of casting and machining.

In accordance with additional or alternative embodiments, the defining includes recessing the passages into the first section from an edge of the first section and the metallurgically bonding includes bonding the edge of the first section to a corresponding edge of the second section.

In accordance with additional or alternative embodiments, the metallurgically bonding includes at least one of field assisted sintering technology (FAST) and/or spark plasma sintering (SPS).

According to another aspect of the disclosure, a method of assembling a part is provided and includes building up a multi-layered first section of the part, defining, in the multi-layered first section, passages with dimensions as small as 0.005 inches (0.127 mm), building up a multi-layered second section of the part, metallurgically bonding each layer of the multi-layered first and second sections to neighboring layers whereby the passages are delimited by respective layers of the multi-layered first and second sections and executing the metallurgically bonding without modifying a condition of the passages.

In accordance with additional or alternative embodiments, the part includes a blade outer air seal (BOAS) of a gas turbine engine and the passages are fluidly coupled to a cooling circuit.

In accordance with additional or alternative embodiments, the multi-layered first and second sections include similar or dissimilar materials.

In accordance with additional or alternative embodiments, the method further includes coating the passages.

In accordance with additional or alternative embodiments, the building up of the multi-layered first and second sections include at least one of field assisted sintering technology (FAST) and spark plasma sintering (SPS).

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
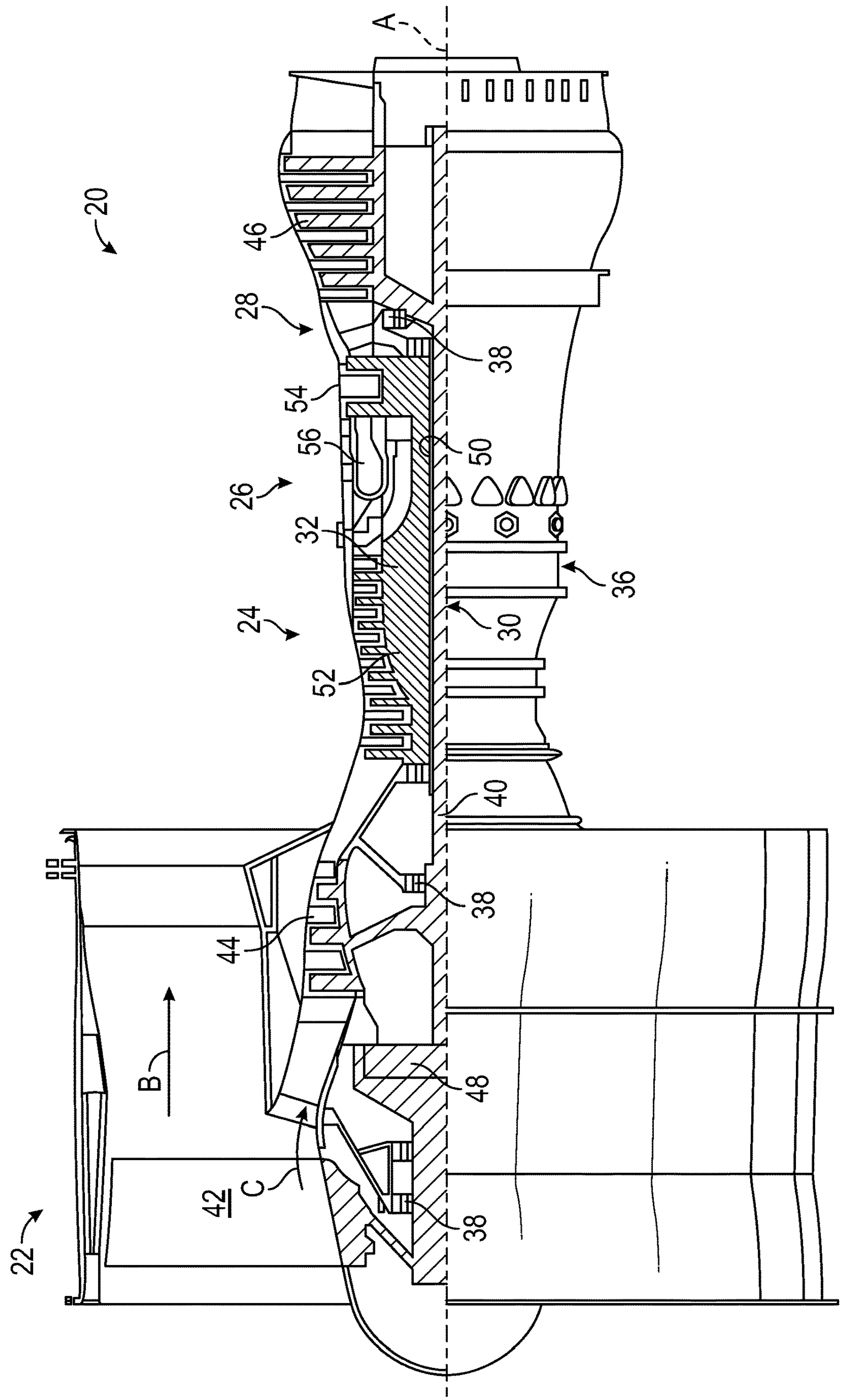
FIG. 1 is a partial cross-sectional view of a gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150 ft/second (350.5 m/sec).

Field assisted sintering technology (FAST) is a consolidation process at temperatures lower than the melting point of the materials being worked on. Similar to hot pressing, FAST forms bonds between materials but at temperatures that are about ~200° C. lower than their melting point(s). FAST utilizes a high amperage pulsed direct current (DC) electrical current to heat the materials to be bonded through Joule heating while under uniaxial compression. The consolidation is a combination of solid-state transport mechanisms including primarily diffusion and creep. The result is a metallurgical bond between the materials to be joined. Consolidation or joining can be accomplished in a variety of conductive and non-conductive materials and forms. Spark plasma sintering (SPS), though different from FAST, is also a consolidation process. Recently, FAST/SPS has been gaining acceptance for consolidation of powder materials into dense compacts with significantly greater efficiency than hot pressing. Due to the lower processing temperatures over other consolidation methods, FAST/SPS mitigates significant grain growth common in other diffusional bonding methods.

FAST is advantageous over other sources of bonding such as diffusional bonding, dual alloy casting, brazing, transient liquid phase bonding or welding under high temperature protective atmosphere. Some of the advantages of FAST over these other methods are detailed below.

Diffusional bonding does not use (is devoid of) the application of a DC current for heating that enhances bond line diffusion. It however uses a much higher temperature (than temperatures used in FAST) and a longer bonding cycle than FAST but is also conducted below the melting point of the alloy. Due to the higher temperatures and longer cycles, diffusional bonding can result in aging of the alloys (e.g., coursing of gamma prime phase in nickel-based alloys) or detrimental feature formations (e.g., recrystallization in single crystal alloys) that are generally considered detrimental.

Dual alloy casting includes casting a first piece then remelting an interface and casting a second piece onto the molten portion of the first piece. This process is typically conducted above a melting point of the subject alloy as it is a method that includes casting (pouring of a molten metal).

In FAST, it is easier to locate the bond line (between the first portion and the second portion) with high precision as it relies on machining of two pieces to a specific shape with little or no displacement of that contact surface thereafter. Dual casting relies on a partial fill of the first casting, remelting of the interface and a mixing of the interface thereby making the bond line location more variable. Metallurgy of the bond line is going to be a composite of the alloys selected as they will undergo mixing in the melt or in a partially molten state. This may result in the formation of deleterious phases as a result of dissimilar alloy combinations. These deleterious phases will come out (i.e., precipitate) much more quickly and over larger zone sizes in dual alloy casting.

Brazing requires low melt alloy (in the case of nickel superalloy bonding commonly a boron or silicon enriched alloy) to be placed between two alloys to be bonded. The low melt alloy is melted and then solidified forming the joint between the two alloys. A capability of the joint is dependent on the low melt alloy which will have obviously lower temperature capability but also generally lower mechanical and environmental properties as it is selected for its melt point. It therefore includes mechanical and environmental properties. The strength of brazed joints is generally low (typically no greater than a few kilopounds per square inch (KSI)). Brazing has a much lower performance capability than FAST or dual alloy casting.

Transient Liquid Phase (TLP) bonding is similar to brazing but uses more complex alloys (in lieu of the low melt alloy using in brazing) and uses more complete mixing during the diffusion cycle. This results in generally higher mechanical and environmental capabilities over brazing but significantly less than the individual alloys used to form the bond. TLP has a much lower expected capability than FAST or dual alloy casting.

Welding high temperature protective atmosphere (example includes superalloy welding at elevated temperature or SWET) involves welding and therefore requires melting of the alloy and consequent re-solidification. The bond line between the two alloys will be a welded feature with an equiaxed grain structure and associated weld defects (e.g., quench cracking is one common challenge). The bond line will have its own unique capability and be different than the alloys bonded. This technique (SWET) is not capable of maintaining a single crystal continuous structure and therefore is a detriment in physical and environmental properties.

In summary, FAST is advantageous over these other methods because it can retain the single crystal characteristics across the bond line and because it can facilitate retention of the structure that existed before the bonding process to retain material performance of the alloys involved and to maximize the performance across the bond line. It also results in a continuum of structure (e.g., crystalline structure) from the first portion to the second portion after the bonding process.

As will be described below, a multi-layer build-up of a substrate by FAST processing can allow for cooling channels to be constructed. Cooling passages can be near-surface cooling passages for a duration, cross-layers by voids in layers or orifices and turned into and through different radial layers so as to deliver warmed air to outer diameter (OD) structures or to the benefit of a having an exit location with reduced pressure.

In addition, as will be described below, the BOAS is formed from two individual castings that include the hot side (gaspath) and cold side (attachment). Cooling channels may be formed between the two parts. After machining preparation of a bond joint, the two parts are bonded using FAST processing to enclose the channels in highly effective cooling circuits. This FAST processing can occur between similar or dissimilar materials. For example, the hot side part can be constructed of an alloy optimized for oxidation and the cold side part can be constructed from an alloy optimized for corrosion resistance.

Figure 2:
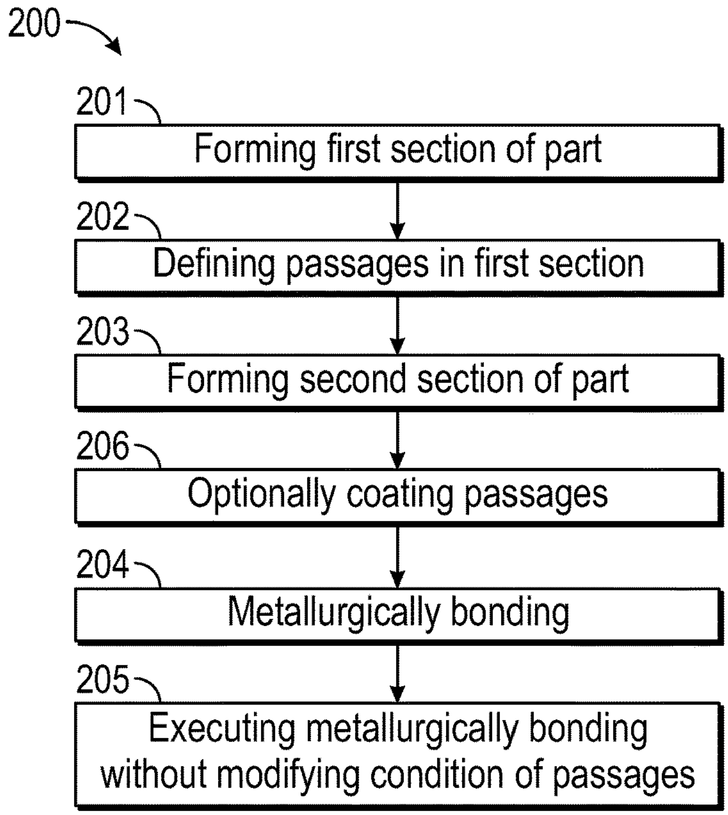
FIG. 2 is a flow diagram illustrating a method of assembling a part in accordance with embodiments.
Figure 3:
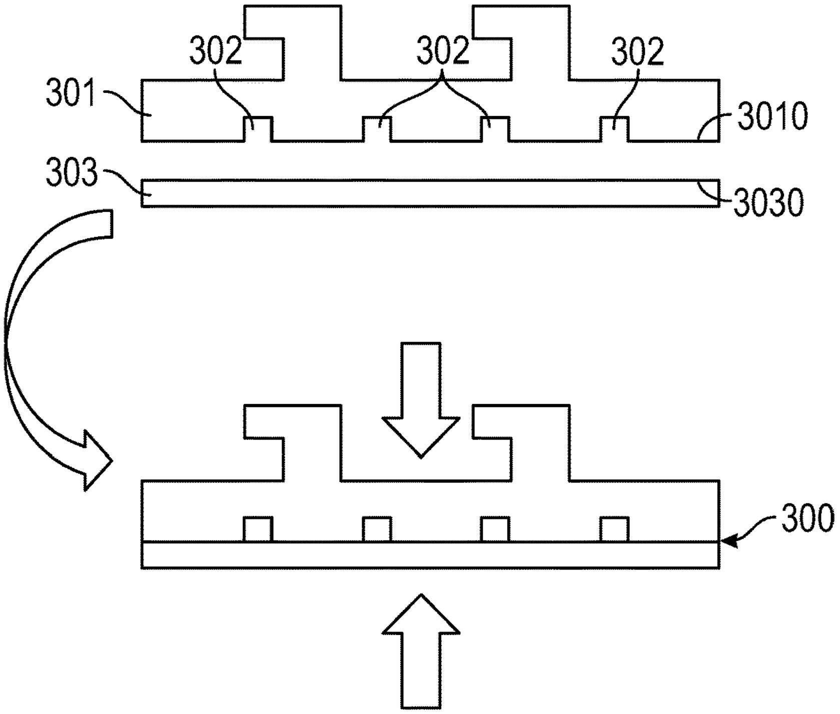
FIG. 3 is a diagram illustrating the method of assembling the part of FIG. 2 in accordance with embodiments.

With continued reference to FIG. 1 and with additional reference to FIGS. 2 and 3, a method 200 of assembling a part 300 is provided where the part 300 can be used, for example, in the engine 20. As shown in FIGS. 2 and 3, the method 200 includes forming a first section 301 of the part 300 (201) by at least one of casting and machining, defining, in the first section 301, passages 302 with dimensions (e.g., diameters) as small as 0.005 inches or 0.127 mm (202), forming a second section 303 of the part 300 (203) by at least one of casting and machining and metallurgically bonding the first section 301 and the second section 303 whereby the passages 302 are delimited by the first section 301 and the second section 303 (204). The metallurgically bonding of operation 204 can be preceded by an operation of preparing the first section 301 and the second section 303 for the metallurgically bonding by, for example, surface machining and/or cleaning that provides for good contact-making bonding surfaces. In addition, the method 200 includes executing the metallurgically bonding of operation 204 without modifying a condition of the passages 302 (205) whereby there is no significant change in the shapes or sizes of the passages 302. The defining of operation 202 (see FIG. 2) can include recessing the passages 302 into the first section 301 from an edge 3010 of the first section 301. The metallurgically bonding of operation 205 can include bonding the edge 3010 of the first section 301 to a corresponding edge 3030 of the second section 303 so that each passage 302 is bordered on each side by the first section 301 or the second section 303. In any case, the metallurgically bonding of operation 205 can include at least one of FAST and SPS.

The method 200 of FIG. 2 can further include an optional operation of coating the passages 302 (206) prior to the metallurgical bonding of operation 204.

The executing of the metallurgically bonding of operation 204 without modifying the condition of the passages 302 of operation 205 serves to preserve a shape and size of the passages 302. That is, in the case of the passages 302 having dimensions of about 0.005 inches or 0.127 mm prior to the metallurgically bonding of operation 204, the passages 302 will continue to have dimensions of about 0.005 inches or 0.127 mm following the metallurgically bonding of operation 204.

While the description provided above refers to passages 302 being defined in the first section 301, it is to be understood that other embodiments exist. For example, additional passages may be defined in the second section 303. These additional passages can mirror the passages 302 or can be arranged differently from the passages 302. In the mirrored case, the diffusion line can be centered between the passages 302 and the additional passages. In the case where the passages 302 and the additional passages are arranged differently, the passages 302 and the additional passages can be arranged to provide for cross-flow or multi-directional flow.

In any case, the passages 302 and the additional passages can have various shapes and sizes. For example, while the passages 302 are illustrated in FIG. 3 as being rectangular passages 302 with widths of about 0.005 inches or 0.127 mm, it is to be understood that the passages could have circular, nearly circular or otherwise rounded cross-sectional shapes. Moreover, the passages 302 can be straight in a longitudinal axis, curved or bent. In these or other cases, each individual passage 302 can be shaped and sized similarly to the other passages 302 or uniquely shaped or sized to provide for correspondingly unique flow patterns.

Using FAST or SPS processing allows the dimensions of the passages 302 to be reduced to a far smaller scale than what would be possible using conventional processing techniques. For example, conventional processing that does not include FAST or SPS would permit a part to be assembled or formed with passages having dimensions of about 0.050 inches. By contrast, the use of the FAST or SPS processing permits a reduction in the dimensions of the passages by about an order of magnitude or more.

Figure 4:
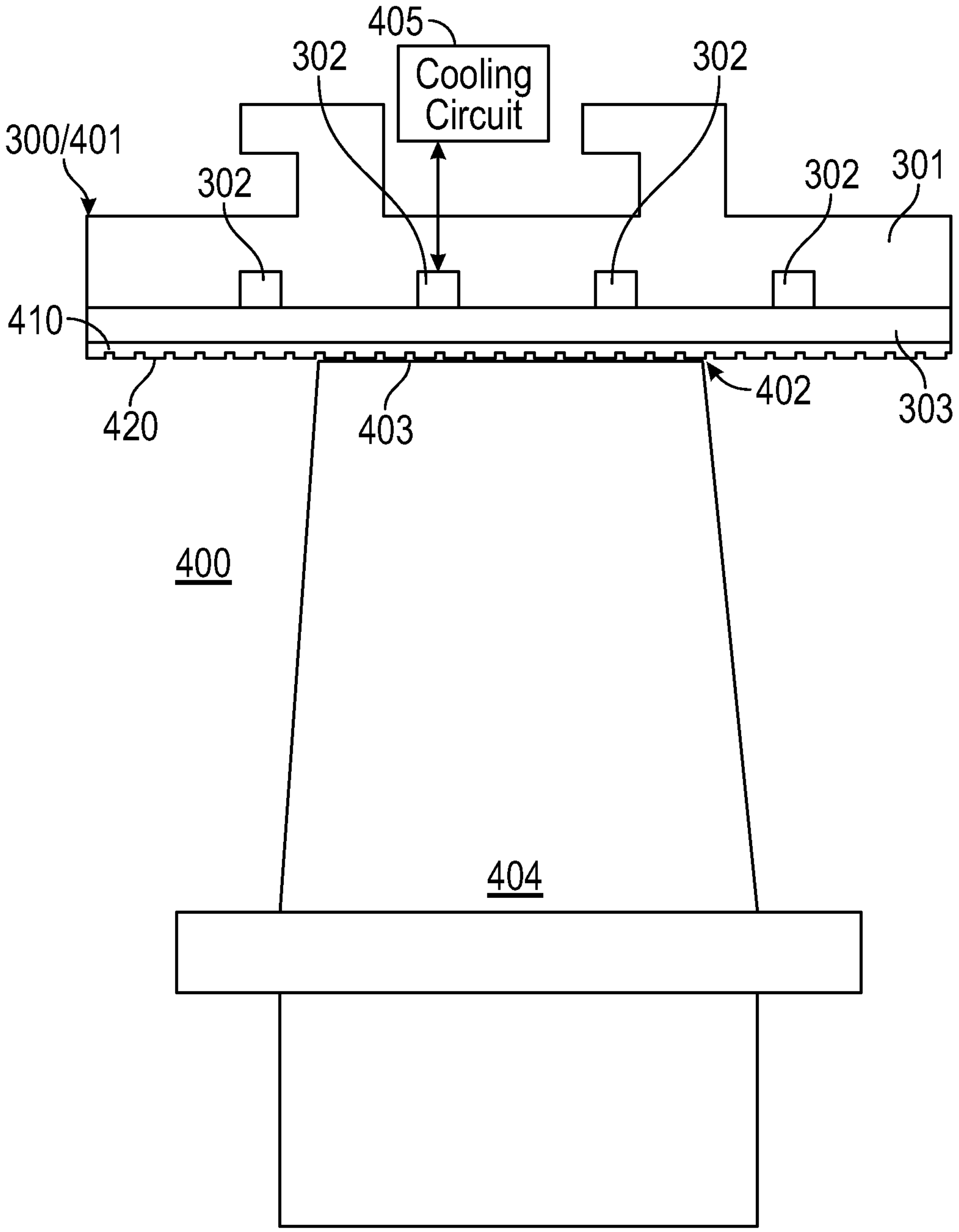
FIG. 4 is a side view of a blade outer air seal (BOAS) of a gas turbine engine in accordance with embodiments.

With continued reference to FIGS. 1 and 2 and with additional reference to FIG. 4, the part 300 can include or can be provided as a blade outer air seal (BOAS) 401 of a gas turbine engine 400. In these or other cases, the BOAS 401 forms an outer air passage 402 with a distal tip 403 of a turbine blade 404 and the passages 302 are fluidly coupled to a cooling circuit 405 of the gas turbine engine 400.

In accordance with embodiments, the first section 301 and the second section 303 can be formed of similar or dissimilar materials (i.e., similar single crystal alloy materials or dissimilar single crystal alloy materials, material pairs can include, e.g., a same alloy such as PWA 1429 and dissimilar alloys such as PWA 1429 to CM247). Additionally, the ability to bond both single crystal (SX) and equiaxed (EQ) materials and the ability to retain fine features along bond lines have been demonstrated). In the latter case, particularly where the part 300 includes or is provided as the BOAS 401 of the gas turbine engine 400 of FIG. 4, the first section 301 (i.e., the cold side of the part 400, which is normally exposed to relatively cool temperatures and an environment in which a primary damage mode is corrosion) can include a corrosion resistant alloy and the second section 303 (i.e., the hot side of the part 300, which is normally exposed to relatively high temperatures and an environment in which a primary damage mode is oxidation and thermal damage) can include an oxidation resistant alloy. In addition, the second section 303 can also include at least one of a thermal barrier coating 410, which is provided to protect the part 400 from high temperature and high pressure fluids in the outer air passage 402, and an abradable coating 420, which is provided to establish an appropriate size of the outer air passage 402 by allowing for abrasion of the abradable coating 402 by the distal tip 403 of the turbine blade 404 during operations of the gas turbine engine 400.

Passages 302 can optionally be coated prior to the metallurgically bonding of operation 204 to protect from environmental attack. In conventional cases, internal cooling circuits may be coated using non-line-of-sight processes, such as vapor phase aluminiding. These processes tend to have limitations, such as those arising from chemistry. For example, there are not viable production routes to make a platinum modified aluminide, which is generally known to be better than simple aluminides in environmental resistance due to the platinum plating step. However, by having two separate pieces that allow for line-of-sight access, as is the here in the instant application, improved capability coating systems can be utilized. Additionally, the edge 3010 of the first section 301 and the edge 3030 of the second section can be prepared (ground or otherwise machined) post-coating such that contact points between the first and second sections 301 and 303 are not affected by the intra-passage coating.

Figure 5:
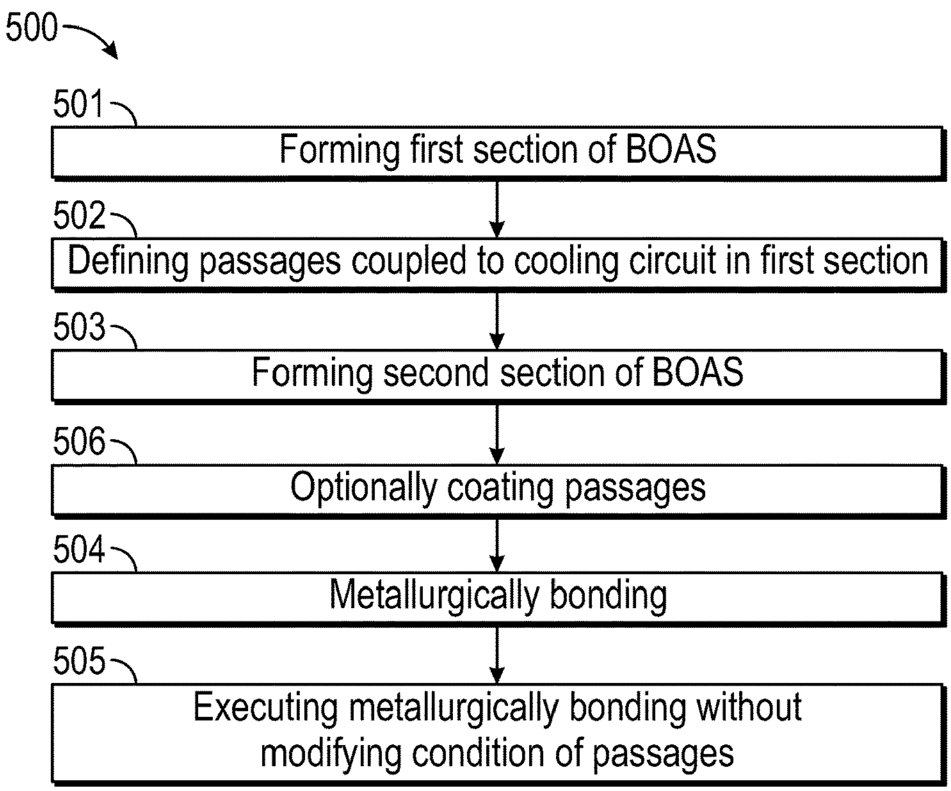
FIG. 5 is a flow diagram illustrating a method of assembling a blade outer air seal (BOAS) in accordance with embodiments.

With reference to FIG. 5, a method 500 of assembling a BOAS of a gas turbine engine with a cooling circuit is provided and can be generally similar to the method 200 described above. As shown in FIG. 5, the method includes forming a first section of the BOAS (501), defining, in the first section, passages fluidly coupled to the cooling circuit with dimensions as small as 0.005 inches or 0.127 mm (502), forming a second section of the BOAS (503), metallurgically bonding the first and second sections whereby the passages are delimited by the first and second sections (504) and executing the metallurgically bonding without modifying a condition of the passages (505).

Figure 6:
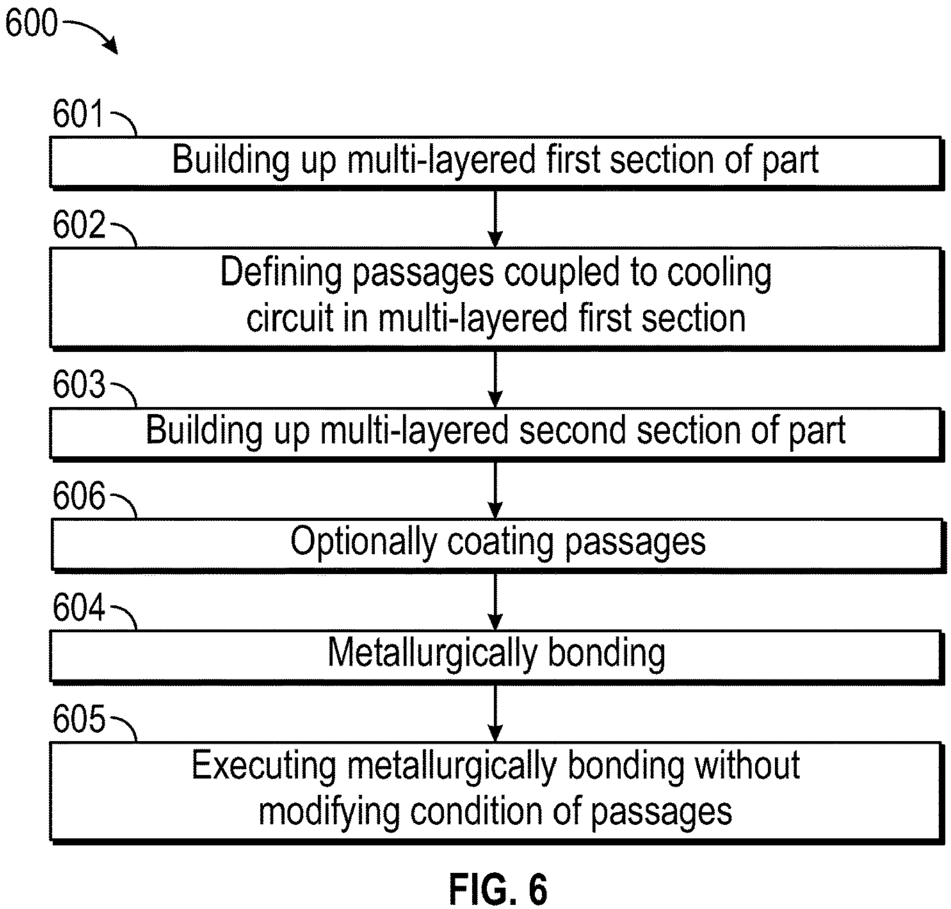
FIG. 6 is a flow diagram illustrating a method of assembling a part in accordance with alternative embodiments.

With reference to FIG. 6, a method 600 of assembling a part, such as a BOAS of a gas turbine engine, is provided and can be generally similar to the method 200 described above. As shown in FIG. 6, the method 600 includes building up a multi-layered first section of the part (601), defining, in the multi-layered first section, passages coupled to a cooling circuit of the gas turbine engine with dimensions as small as 0.005 inches or 0.127 mm (602), building up a multi-layered second section of the part (603), metallurgically bonding each layer of the multi-layered first and second sections to neighboring layers whereby the passages are delimited by respective layers of the multi-layered first and second sections (604) and executing the metallurgically bonding without modifying a condition of the passage (605).

The methods 500 and 600 of FIGS. 5 and 6, respectively, can further include an optional operation of coating the passages (506 and 606) prior to the metallurgical bonding of operations 504 and 604.

In accordance with embodiments, the multi-layered first and second sections can include similar or dissimilar materials and the building up of the multi-layered first and second sections can include at least one of FAST and SPS.

Figure 7:
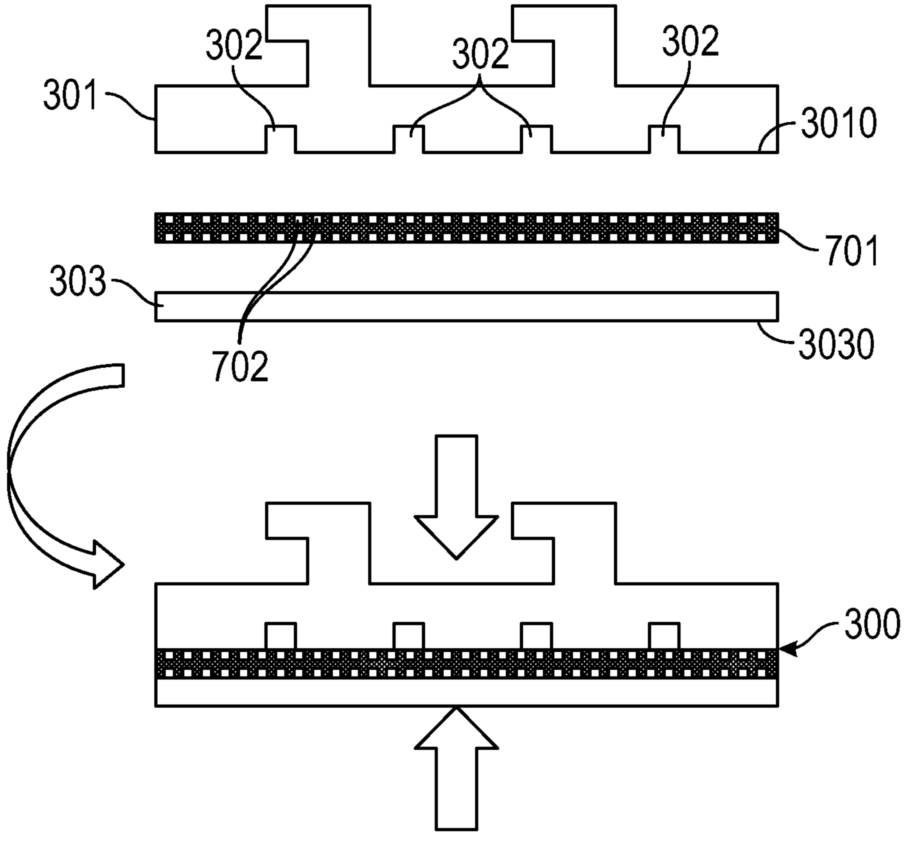
FIG. 7 is a diagram illustrating the method of assembling the part of FIG. 2 with an intervening part section in accordance with further embodiments.

With reference to FIG. 7, the part 300 as described above with reference to FIG. 3, can include one or more interposer sections 701 between the first section 301 and the second section 303. In these or other cases, the part 300 is formed as a stack of sections with multiple passages (e.g., passages 302 and additional passages 702 in the one or more interposer sections 701) in one or more of the first section 301, the second section 303 and the one or more interposer sections. These multiple passages can provide for various internal and external cooling, using cross-flow or multi-directional flow patterns.

In an embodiment, a first alloy for use in the methods described herein may be a "high strength" metal alloy. Examples of the first alloy include Alloy D, René N5, CMSX-4, CMSX-10, TMS-138 or TMS-162. The metal alloys are nickel-based metals that in addition to nickel comprise one or more of chromium, cobalt, molybdenum, aluminum, titanium, tantalum, niobium, ruthenium, rhenium, boron and carbon. The metal alloys contain one or more of the following metals in addition to nickel—2 to 10 wt % of chromium, 2 to 11 wt % of cobalt, 0.5 to 5 wt % molybdenum, 4 to 7.5 wt % of tungsten, 3-7 wt % of aluminum, 0 to 5 wt % of titanium, 3 to 10 wt % of tantalum and 2-8 wt % of rhenium. The metal alloys may also contain ruthenium, carbon and boron.

The composition of these alloys is defined to maximize mechanical properties in a single crystal form while maintaining an adequate level of environmental resistance. Table 1 and Table 2 shows preferred ranges (of the ingredients) for the compositions (in weight percent) that may be used for the first alloy. Table 2 contains broader ranges for some of the alloys (than those indicated in Table 1) that may be used in the first portion.

TABLE 1

| | COMPOSITION (WT. %) | | | | | | | | | | | | | | |
|---|---|---|---|---|---|---|---|---|---|---|---|---|---|---|---|
| ALLOY | Cr | Co | Mo | W | Al | Ti | Ta | Nb | Re | Ru | Hf | C | B | Zr | Ni |
| IN-713LC | 12 | — | 4.5 | — | 5.9 | 0.6 | — | 2 | — | — | — | 0.05 | 0.01 | 0.1 | BAL |
| IN-730LC | 16 | 8.5 | 1.75 | 2.6 | 3.4 | 3.4 | 1.75 | 0.9 | — | — | — | 0.11 | 0.01 | 0.04 | BAL |
| RENE 80 | 14 | 9 | 4 | 4 | 3 | 4.7 | — | — | — | — | 0.8 | 0.16 | 0.015 | 0.01 | BAL |
| MAR-M247 | 8 | 10 | 0.6 | 10 | 5.5 | 1 | 3 | — | — | — | 1.5 | 0.15 | 0.015 | 0.03 | BAL |
| MAR-M200HF | 8 | 9 | — | 12 | 5 | 1.9 | — | 1 | — | — | 2 | 0.13 | 0.015 | 0.03 | BAL |
| CM247LC | 8.1 | 9.2 | 0.5 | 9.5 | 5.6 | 0.7 | 3.2 | — | — | — | 1.4 | 0.07 | 0.015 | 0.007 | BAL |
| CM186LC | 6 | 9.3 | 0.5 | 8.4 | 5.7 | 0.7 | 3.4 | — | 3.0 | — | 1.4 | 0.07 | 0.015 | 0.005 | BAL |
| ALLOY A | 6.5 | 10 | 1.7 | 6.5 | 6 | — | 4 | — | 3.0 | — | 1.5 | 0.1 | 0.015 | 0.1 | BAL |
| CMSX-2 | 8 | 5 | 0.6 | 8 | 5.6 | 1 | 6 | — | — | — | — | — | — | — | BAL |
| ALLOY B | 10 | 5 | — | 4 | 5 | 1.5 | 12 | — | — | — | — | — | — | — | BAL |
| RENE N4 | 9 | 8 | 2 | 6 | 3.7 | 4.2 | 4 | 0.5 | — | — | — | — | — | — | BAL |
| AM1 | 7 | 8 | 2 | 5 | 5 | 1.8 | 8 | 1 | — | — | — | — | — | — | BAL |
| RR2000 | 10 | 15 | 3 | — | 5.5 | 4 | — | — | — | — | — | — | — | — | BAL |
| CMSX-4 | 6.5 | 9.6 | 0.6 | 6.4 | 5.6 | 1 | 6.5 | — | 3 | — | 0.1 | — | — | — | BAL |
| ALLOY C | 5 | 10 | 2 | 6 | 5.6 | — | 9 | — | 3 | — | 0.1 | — | — | — | BAL |
| RENE N5 | 7 | 8 | 2 | 5 | 6.2 | — | 7 | — | 3 | — | 0.2 | — | — | — | BAL |
| CMSX-10 | 2 | 3 | 0.4 | 5 | 5.7 | 0.2 | 8 | — | 6 | — | 0.03 | — | — | — | BAL |
| TMS-138 | 2.9 | 5.9 | 2.9 | 5.9 | 5.9 | — | 5.6 | — | 4.9 | 2 | 0.1 | — | — | — | BAL |
| TMS-162 | 2.9 | 5.8 | 3.9 | 5.8 | 5.8 | — | 5.6 | — | 4.9 | 6 | 0.09 | — | — | — | BAL |
| CMSX-7 | 6 | 10 | 0.6 | 9 | 5.7 | 0.8 | 9 | — | — | — | 0.2 | — | — | — | BAL |
| CMSX-8 | 5.4 | 10 | 0.6 | 5 | 5.7 | 0.7 | 8 | — | 1.5 | — | 0.1 | — | — | — | BAL |

TABLE 2

| | Cr | Co | Mo | W | Al | Ti | Ta | Nb | Re | Ni |
|---|---|---|---|---|---|---|---|---|---|---|
| Alloy D | 5-7 | 9-11 | 1.5-2.5 | 5.5-7.5 | 5-7 | — | 3-10 | — | 2-4 | Balance |
| René N5 | 6-10 | 7-9 | 1.5-2.5 | 4-7 | 3-7 | 0-5 | 3-8 | 0-1 | 0-4 | Balance |
| CMSX-4 | 4-8 | 7-10 | 0.5-1.5 | 5.5-7.5 | 5-6 | 0-2 | 5-8 | — | 2-4 | balance |
| CMSX-10 | 1-3 | 2-4 | 0.1-1 | 4-6 | 5-7 | 0.1-0.4 | 6-10 | | 4-8 | balance |
| TMS-138 | 2-4 | 3.5-6.5 | 2-4 | 5-7 | 5-7 | — | 5-7 | | 4-6 | balance |
| TMS-162 | 2-4 | 3.5-6.5 | 3-5 | 5-7 | 5-7 | — | 5-7 | | 5-7 | balance |

The high strength alloys can withstand stresses of greater than 800 MPa at temperatures greater than 600° C. and stresses of greater than 200 MPa at temperatures of greater than 800° C.

Second alloys for use in the methods described herein are selected for their ability to handle harsh environmental conditions and can include René 195 and René N2. These compositions were developed with an eye to improved environmental resistance. This can be seen in the Al and Cr levels as compared with Re, W, Mo shown in the Table 3. The cobalt to chromium ratios are lower for the second alloys, while the aluminum to cobalt ratio is much higher for the second alloys when compared with the first alloys.

The second alloys can be a nickel-based alloy that in addition to nickel includes one or more of chromium, cobalt, molybdenum, aluminum, titanium, tantalum, niobium, ruthenium, rhenium, boron and carbon. The metal alloys contain one or more of the following metals in addition to nickel—7 to 14 wt % of chromium, 3 to 9 wt % of cobalt, 0.1 to 0.2 wt % molybdenum, 3 to 5 wt % of tungsten, 6-9 wt % of aluminum, 0 to 5 wt % of titanium, 4 to 6 wt % of tantalum, 0.1 to 0.2 wt % f hafnium and 1-2 wt % of rhenium. The metal alloys may also contain ruthenium, carbon and boron.

TABLE 3

| | Cr | Co | Al | Ta | Mo | W | Re | Hf | Ni |
|---|---|---|---|---|---|---|---|---|---|
| René 195 | 7-9 | 3-4 | 7-9 | 5-6 | 0.1-0.2 | 3-5 | 1-2 | 0.1-0.2 | balance |
| René N2 | 12-14 | 7-9 | 6-8 | 4-6 | | 3-4 | 1-2 | 0.1-0.2 | balance |

The high strength alloys used in the second alloys can withstand stresses of at least 50% of the first alloys. In an embodiment, the high strength alloys used in the second alloys are environmentally resistant and withstand temperatures of greater than 1200° C. (under oxidation conditions) while undergoing less than 0.05 grams of weight loss per unit weight.

Technical effects and benefits of the present disclosure are the provision of forming multi-layer passages that can carry heated air radially outboard for reduced thermal gradients thus improving part life and/or to alternate dump locations for maximized cooling effectiveness. Additional technical effects and benefits of the present disclosure are the provision of methods of assembling a hybrid BOAS by bonding a hot side alloy optimized for oxidation and a cold side alloy optimized for corrosion resistance so that maximum durability of the component is achieved. Applying optimal coatings to each of the pieces prior to assembly can also simplify manufacturing and reduce the risk of cross contamination between the different coating zones. Oxidation and thermal barrier coatings applied to the hot side component may also require specific wear characteristics due to rub interactions with turbine blade tips. An additional abradable coating may be applied to minimize tip clearances when rub interaction occurs with the turbine blades. Depending on the thermal environment, the hot surface may not require coating and in that case, the hot side alloy may be selected to achieve optimal wear interactions with the turbine blade. By utilizing hybrid alloy bonding, the flexibility still exists to select a cold side alloy which maximizes overall part durability.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method of assembling a blade outer air seal (BOAS) of a gas turbine engine to form a curved outer air passage with a distal tip of a turbine blade, the method comprising:

forming a first section as a curved outer section of the BOAS;

defining, in the first section, passages with a depth greater than 0.005 inches (0.127 mm);

forming a second section as a curved inner section of the BOAS;

metallurgically bonding the first and second sections whereby the passages are delimited by the first and second sections; and executing the metallurgically bonding without modifying shapes and sizes of the passages, wherein the metallurgically bonding comprises field assisted sintering technology (FAST) and FAST utilizes a high amperage pulsed direct current (DC) electrical current to heat the first and second sections for bonding through Joule heating while under uniaxial compression that accommodates respective curvatures of the first and second sections, wherein:

the method further comprises defining, in the second section, additional passages that mirror the passages of the first section, the metallurgically bonding of the first and second sections comprises metallurgically bonding the first and second sections by FAST along a line centered between the passages of the first section and the additional passages, and the passages are fluidly coupled to a cooling circuit.

2. The method according to claim 1, wherein the first section comprises a corrosion resistant alloy and the second section comprises an oxidation resistant alloy.

3. The method according to claim 1, further comprising coating the passages.

4. The method according to claim 1, wherein:

the forming of the first section comprises at least one of casting and machining, and the forming of the second section comprises at least one of casting and machining.

5. The method according to claim 1, wherein:

the defining comprises recessing the passages into the first section from an edge of the first section, and the metallurgically bonding comprises bonding the edge of the first section to a corresponding edge of the second section by FAST so that each passage is bordered on each side by the first section or the second section and so that the shapes and sizes of the passages are preserved without modification.

6. A method of assembling a blade outer air seal (BOAS) of a gas turbine engine with a cooling circuit to form a curved outer air passage with a distal tip of a turbine blade, the method comprising:

forming a first section as a curved outer section of the BOAS;

defining, in the first section, passages fluidly coupled to the cooling circuit with a depth greater than 0.005 inches (0.127 mm);

forming a second section as a curved inner section of the BOAS;

metallurgically bonding the first and second sections whereby the passages are delimited by the first and second sections; and executing the metallurgically bonding without modifying shapes and sizes of the passages, wherein the metallurgically bonding comprises field assisted sintering technology (FAST) and FAST utilizes a high amperage pulsed direct current (DC) electrical current to heat the first and second sections for bonding through Joule heating while under uniaxial compression that accommodates respective curvatures of the first and second sections, wherein:

the method further comprises defining, in the second section, additional passages that mirror the passages of the first section, the metallurgically bonding of the first and second sections comprises metallurgically bonding the first and second sections by FAST along a line centered between the passages of the first section and the additional passages, and the passages are fluidly coupled to the cooling circuit.

7. The method according to claim 6, wherein the first section comprises a corrosion resistant alloy and the second section comprises an oxidation resistant alloy.

8. The method according to claim 6, further comprising coating the passages.

9. The method according to claim 6, wherein the second section further comprises at least one of a thermal barrier coating or an abradable coating.

10. The method according to claim 6, wherein:

the forming of the first section comprises at least one of casting and machining, and the forming of the second section comprises at least one of casting and machining.

11. The method according to claim 6, wherein:

the defining comprises recessing the passages into the first section from an edge of the first section, and the metallurgically bonding of the first and second sections comprises bonding the edge of the first section to a corresponding edge of the second section by FAST so that each passage is bordered on each side by the first section or the second section and so that the shapes and sizes of the passages are preserved without modification.

* * * * *